US009421829B2

(12) United States Patent
Kishizoe

(10) Patent No.: US 9,421,829 B2
(45) Date of Patent: Aug. 23, 2016

(54) PNEUMATIC TIRE

(71) Applicant: The Yokohama Rubber Co., LTD., Minato-ku, Tokyo (JP)

(72) Inventor: Isamu Kishizoe, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 859 days.

(21) Appl. No.: 13/675,507

(22) Filed: Nov. 13, 2012

(65) Prior Publication Data

US 2013/0118663 A1 May 16, 2013

(30) Foreign Application Priority Data

Nov. 14, 2011 (JP) .................. 2011-249121

(51) Int. Cl.
*B60C 11/12* (2006.01)
*B60C 11/03* (2006.01)

(52) U.S. Cl.
CPC ............. *B60C 11/12* (2013.01); *B60C 11/0304* (2013.04); *B60C 11/0318* (2013.04); *B60C 11/1218* (2013.04); *B60C 2011/0334* (2013.04)

(58) Field of Classification Search
CPC .... B60C 11/03; B60C 11/12; B60C 11/0304; B60C 11/0306; B60C 11/0309; B60C 11/0311; B60C 2011/1209; B60C 2011/1213; B60C 11/1218; B60C 11/1222; B60C 2011/1227; B60C 11/1236
USPC .......... 152/209.1, 209.2, 209.3, 209.8, 209.9, 152/209.12, 209.13, 209.16, 209.18, 209.25
See application file for complete search history.

(56) References Cited

U.S. PATENT DOCUMENTS 4,298,046 A * 11/1981 Herbelleau et al. ...... 152/209.23
5,415,215 A * 5/1995 Covert et al. ............. 152/209.9
2009/0266457 A1 10/2009 Kojima

FOREIGN PATENT DOCUMENTS

EP 0420834 * 4/1991
EP 1529659 * 5/2005
(Continued)

OTHER PUBLICATIONS

EP 1529659, May 2005, English language machine translation from European Patent Office [http://www.epo.org].*
(Continued)

*Primary Examiner* — Eric Hug
(74) *Attorney, Agent, or Firm* — Thorpe North & Western

(57) ABSTRACT

A pneumatic tire including a plurality of circumferential main grooves extending in a tire circumferential direction and a plurality of land portions partitioned and formed by these circumferential main grooves in a tread portion. Additionally, each of these land portions has a plurality of sipes, respectively. Moreover, not less than 90% of the sipes disposed in the inner side region are constituted by two-dimensional sipes and not less than 90% of the sipes disposed in the outer side region are constituted by three-dimensional sipes. The left and right shoulder land portions each have a plurality of lug grooves arranged in the tire circumferential direction. A pitch number $N_{in}$ of the lug grooves in the shoulder land portion on the inner side region side and a pitch number $N_{out}$ of the lug grooves in the shoulder land portion on the outer side region side have a relationship such that $N_{in} > N_{out}$.

20 Claims, 7 Drawing Sheets

(56) References Cited

FOREIGN PATENT DOCUMENTS

| | | | |
|---|---|---|---|
| EP | 1630004 | * | 3/2006 |
| EP | 1795372 | * | 6/2007 |
| JP | S63-159110 | | 7/1988 |
| JP | H07-257114 | | 10/1995 |
| JP | H11-321240 | | 11/1999 |
| JP | 2006-192929 | | 7/2006 |
| JP | 2007-015511 | | 1/2007 |
| JP | 2007-153056 | | 6/2007 |
| JP | 2007-168628 | | 7/2007 |
| JP | 2008-132810 | | 6/2008 |
| JP | 2009-012678 | | 1/2009 |
| JP | 4316452 | | 5/2009 |
| JP | 2009-262874 | | 11/2009 |
| JP | 2010-006108 | | 1/2010 |
| WO | WO 2005-032855 | | 4/2005 |
| WO | WO 2010-005057 | | 1/2010 |

OTHER PUBLICATIONS

EP 1630004, Mar. 2006, English language machine translation from European Patent Office [http://www.epo.org].*

Souza's Tire Service, "What Tire Sidewall Markings Mean", Aug. 2015 [http://www.souzastireservice.com/tires-101/tire-sidewall-markings.aspx].*

* cited by examiner

|  | Conventional Example 1 | Conventional Example 2 | Comparative Example | Working Example 1 | Working Example 2 | Working Example 3 |
|---|---|---|---|---|---|---|
| Tread pattern | FIG. 2 | FIG. 2 | FIG. 2 | FIG. 2 | FIG. 2 | FIG. 2 |
| Number of circumferential main grooves | 3 | 3 | 3 | 3 | 3 | 3 |
| Form of inner side region land portion sipes | Two-dimensional | Two-dimensional | Three-dimensional | Two-dimensional | Two-dimensional | Two-dimensional |
| Form of outer side region land portion sipes | Two-dimensional | Two-dimensional | Two-dimensional | Three-dimensional | Three-dimensional | Three-dimensional |
| Pitch number of inner side region land portion lug grooves | Large | Large | - | Large | Large | Large |
| Pitch number of outer side region land portion lug grooves | Small | Small | - | Small | Small | Small |
| $N_{in}$ | 72 | 82 | 72 | 72 | 72 | 72 |
| $N_{out}$ | 64 | 64 | 62 | 62 | 64 | 62 |
| $N_{in}-N_{out}$ | 8 | 18 | 10 | 10 | 8 | 10 |
| $D_{in}/D_{out}$ | 1.4 | 1.2 | 1.5 | 1.5 | 1.0 | 1.0 |
| $S_{out}/S_{in}$ | 1.2 | 1.2 | 1.5 | 1.5 | 1.0 | 1.0 |
| $S_t$ | 0.40 | 0.40 | 0.35 | 0.35 | 0.35 | 0.35 |
| W2/W1 | 4.0/10.0 | 4.0/10.0 | 8.0/7.0 | 9.0/7.0 | 8.0/7.0 | 8.0/7.0 |
| W2-W1 | 6.0 | 6.0 | 1.0 | 2.0 | 1.0 | 1.0 |
| Hd2/Hd1 | 7.5/7.5 | 7.5/7.5 | 8.5/7.5 | 8.5/7.5 | 8.5/7.5 | 8.5/7.5 |
| Hd2-Hd1 | 0 | 0 | 2.0 | 2.0 | 2.0 | 2.0 |
| Dry steering stability | 100 | 90 | 97 | 110 | 105 | 107 |
| Snow steering stability | 100 | 105 | 98 | 110 | 105 | 105 |

FIG. 7a

|  | Working Example 4 | Working Example 5 | Working Example 6 | Working Example 7 | Working Example 8 |
|---|---|---|---|---|---|
| Tread pattern | FIG. 2 | FIG. 2 | FIG. 2 | FIG. 2 | FIG. 6 |
| Number of circumferential main grooves | 3 | 3 | 3 | 3 | 3 |
| Form of inner side region land portion sipes | Two-dimensional | Two-dimensional | Two-dimensional | Two-dimensional | Two-dimensional |
| Form of outer side region land portion sipes | Three-dimensional | Three-dimensional | Three-dimensional | Three-dimensional | Three-dimensional |
| Pitch number of inner side region land portion lug grooves | Large | Large | Large | Large | Large |
| Pitch number of outer side region land portion lug grooves | Small | Small | Small | Small | Small |
| $N_{in}$ | 72 | 72 | 72 | 72 | 72 |
| $N_{out}$ | 62 | 62 | 62 | 62 | 62 |
| $N_{in}-N_{out}$ | 10 | 10 | 10 | 10 | 10 |
| $D_{in}/D_{out}$ | 2.5 | 1.5 | 1.5 | 1.5 | 1.5 |
| $S_{out}/S_{in}$ | 2.5 | 1.5 | 1.5 | 1.5 | 1.5 |
| $S_t$ | 0.35 | 0.35 | 0.35 | 0.35 | 0.35 |
| W2/W1 | 8.0/7.0 | 8.0/8.0 | 9.0/7.0 | 9.0/4.0 | 9.0/7.0 |
| W2-W1 | 1.0 | 0 | 2.0 | 5.0 | 2.0 |
| Hd2/Hd1 | 8.5/7.5 | 8.5/8.5 | 8.5/8.5 | 8.5/6.0 | 8.5/7.5 |
| Hd2-Hd1 | 2.0 | 0 | 0 | 2.5 | 2.0 |
| Dry steering stability | 108 | 105 | 105 | 105 | 112 |
| Snow steering stability | 106 | 108 | 110 | 110 | 113 |

FIG. 7b

PNEUMATIC TIRE

PRIORITY CLAIM

Priority is claimed to Japan Patent Application Serial No. 2011-249121 filed on Nov. 14, 2011.

BACKGROUND

1. Technical Field

The present technology relates to a pneumatic tire, and particularly relates to a pneumatic tire by which both dry steering stability and snow steering stability can be achieved.

2. Related Art

In a typical winter tire, a tread portion has sipes in order to enhance snow steering stability of the tire. The technology described in Japanese Unexamined Patent Application Publication No. 2010-6108A is known as a conventional pneumatic tire that is configured in this manner. In conventional pneumatic tires, compared to the tread portion on a vehicle mounting outer side, the tread portion on a vehicle mounting inner side is formed from a softer rubber and also has a lower sipe density.

With winter tires, there is a demand for enhancement in not only snow steering stability, but also dry steering stability.

SUMMARY

The present technology provides a pneumatic tire whereby both dry steering stability and snow steering stability can be achieved. A pneumatic tire according to the present technology includes a plurality of circumferential main grooves extending in a tire circumferential direction, and a plurality of land portions that are partitioned and formed by the circumferential main grooves in a tread portion. In such a pneumatic tire, a region corresponding to 35% of a tread pattern developed width from a first tread edge is called an "inner side region", a region corresponding to 35% of the tread pattern developed width from a second tread edge is called an "outer side region", the left and right circumferential main grooves outermost in a tire width direction are called "outermost circumferential main grooves", and the land portions on the outer side in the tire width direction partitioned and formed by the left and right outermost circumferential main grooves are called "shoulder land portions". The plurality of land portions each has a plurality of sipes and not less than 90% of the sipes disposed in the inner side region are constituted by two-dimensional sipes and not less than 90% of the sipes disposed in the outer side region are constituted by three-dimensional sipes. The left and right shoulder land portions each have a plurality of lug grooves arranged in the tire circumferential direction, and a pitch number $N_{in}$ of the lug grooves in the shoulder land portion on the inner side region side and a pitch number $N_{out}$ of the lug grooves in the shoulder land portion on the outer side region side have a relationship such that $N_{in} > N_{out}$.

With the pneumatic tire according to the present technology, the pitch number $N_{in}$ of the lug grooves on the inner side region side and the pitch number $N_{out}$ of the lug grooves on the outer side region side preferably have a relationship such that $64 \leq N_{in} \leq 78$, $54 \leq N_{out} \leq 68$, and $3 \leq N_{in} - N_{out} \leq 12$ are satisfied.

With the pneumatic tire according to the present technology, a sipe density $D_{in}$ of the inner side region and a sipe density $D_{out}$ of the outer side region preferably have a relationship such that $1.2 \leq D_{in}/D_{out} \leq 2.0$.

With the pneumatic tire according to the present technology, a groove area ratio $S_{in}$ of the inner side region and a groove area ratio $S_{out}$ of the outer side region in a tire ground contact patch preferably have a relationship such that $1.2 \leq S_{out}/S_{in} \leq 2.0$, and a total groove area ratio $S_t$ in the tire ground contact patch is preferably within a range $0.25 \leq S_t \leq 0.38$.

With the pneumatic tire according to the present technology, a groove width W1 of the lug grooves in the inner side region and a groove width W2 of the lug grooves in the outer side region preferably have a relationship such that $0.5 \text{ mm} \leq W1 - W2 \leq 2.0 \text{ mm}$.

With the pneumatic tire according to the present technology, each of the inner side region and the outer side region preferably comprises lug grooves that open to a tire ground contact edge, and a groove depth Hd1 of the lug grooves in the inner side region and a groove depth Hd2 of the lug grooves in the outer side region preferably have a relationship such that $1.0 \text{ mm} \leq Hd1 - Hd2 \leq 3.0 \text{ mm}$.

With the pneumatic tire according to the present technology, three of the circumferential main grooves and four of the land portions are preferably included in a tread portion, and a ground contact width of the land portion on the ground contact edge of the inner side region is greater than a ground contact width of the land portion on the ground contact edge of the outer side region. The land portions in the inner side region preferably include a plurality of inclined grooves inclining with respect to the tire circumferential direction, a plurality of first lug grooves extending in a tire width direction from an outer side of the tire ground contact patch so as to communicate with the inclined grooves, and a plurality of second lug grooves extending in the tire width direction so as to connect the inclined grooves and the circumferential main groove. Preferably, not less than three of the first lug grooves are in communication with one of the inclined grooves.

The pneumatic tire according to the present technology preferably has an indicator designating a mounting direction on a vehicle wherein the inner side region is on an inner side in a vehicle width direction.

With the pneumatic tire according to the present technology, two-dimensional sipes are disposed in the inner side region, and three-dimensional sipes are disposed in the outer side region. Therefore, rigidity in the inner side region is set to be low and rigidity in the outer side region is set to be high. A pitch number $N_{in}$ of the lug grooves in the shoulder land portion on the inner side region side and a pitch number $N_{out}$ of the lug grooves in the shoulder land portion on the outer side region side have a relationship such that $N_{in} > N_{out}$. Therefore, rigidity of the inner side region is set to be low and rigidity of the outer side region is set to be high. Thus, synergistic lowering of the rigidity in the inner side region occurs and synergistic increasing of the rigidity in the outer side region occurs. As a result, when a pneumatic tire is mounted on a vehicle such that the inner side region is on an inner side in a vehicle width direction, the inner side region will contribute greatly to enhancing snow steering stability and the outer side region will contribute greatly to enhancing dry steering stability. Such a configuration is advantageous because both dry steering stability and snow steering stability of the tire are achieved at high levels.

BRIEF DESCRIPTION OF THE DRAWINGS

FIGS. 7a-7b include a table showing the results of the performance testing of pneumatic tires according to the embodiments of the present technology.

DETAILED DESCRIPTION

The present technology is explained in detail below with reference to the drawings. However, the present technology is not limited to these embodiments. Moreover, constituents of the embodiment which can possibly or obviously be substituted while maintaining consistency with the present technology are included. Furthermore, the multiple modified examples described in the embodiment can be combined as desired within the scope apparent to a person skilled in the art.

Pneumatic Tire

Figure 1:
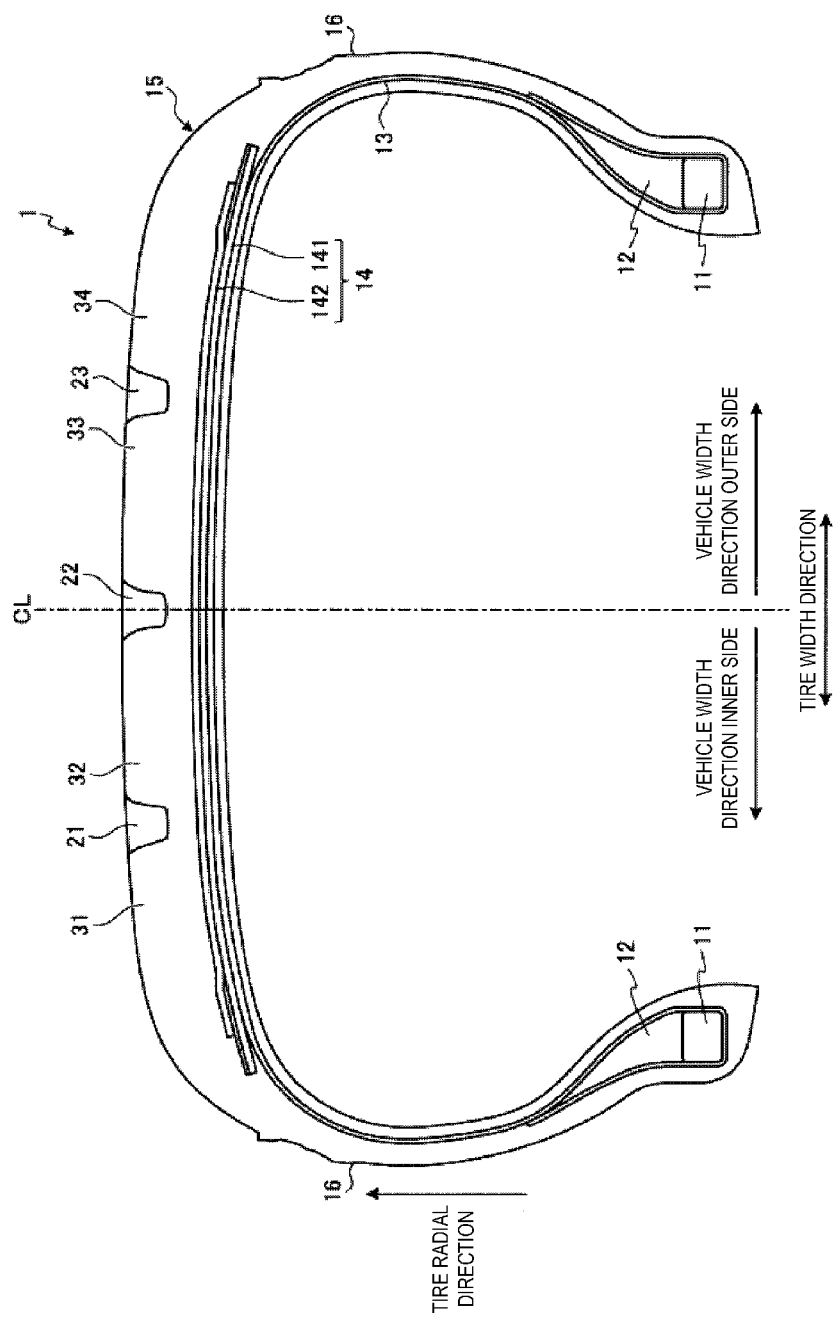
FIG. 1 is a cross-sectional view in a tire meridian direction illustrating a pneumatic tire according to an embodiment of the present technology.
Figure 2:
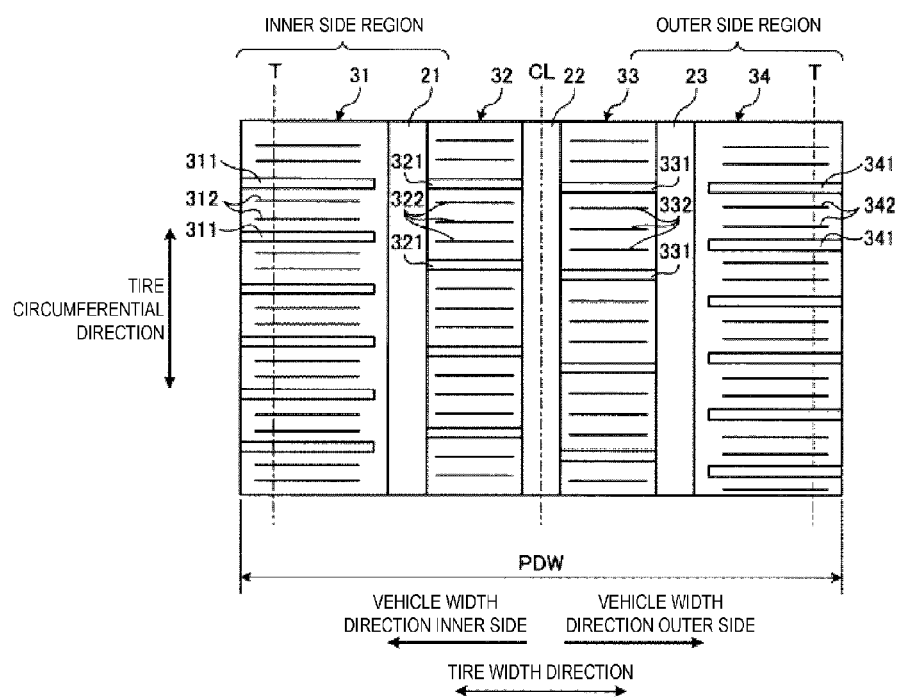
FIG. 2 is a plan vim illustrating a tread surface of the pneumatic tire depicted in FIG. 1.

FIG. 1 is a cross-sectional view in a tire meridian direction illustrating a pneumatic tire according to an embodiment of the present technology. FIG. 2 is a plan view illustrating a tread surface of the pneumatic tire depicted in FIG. 1. These drawings depict a radial tire for use on a passenger car.

A pneumatic tire 1 includes a pair of bead cores 11,11, a pair of bead fillers 12,12, a carcass layer 13, a belt layer 14, tread rubber 15, and a pair of side wall rubbers 16,16 (see FIG. 1). The pair of bead cores 11,11 have annular structures and constitute cores of left and right bead portions. The pair of bead fillers 12,12 is disposed on a periphery of each of the pair of bead cores 11,11 in the tire radial direction so as to reinforce the bead portions. The carcass layer 13 has a single-layer structure, and stretches between the left and right bead cores 11 and 11 in toroidal form, forming a framework for the tire. Additionally, both ends of the carcass layer 13 are folded toward an outer side in the tire width direction so as to envelop the bead cores 11 and the bead fillers 12, and fixed. The belt layer 14 is formed from a pair of belt plies 141 and 142 that are laminated, and is disposed in the tire radial direction on a periphery of the carcass layer 13. These belt plies 141 and 142 are formed by arranging and roll processing a plurality of belt cords made from steel or organic fiber material. A crossply structure is achieved by arranging the belt cords so as to incline in mutually different directions with respect to a tire circumferential direction. The tread rubber 15 is disposed on the periphery of the carcass layer 13 and the belt layer 14 in the tire radial direction, and forms a tire tread. The pair of side wall rubbers 16,16 is disposed on each outer side of the carcass layer 13 in the tire width direction, so as to form left and right sidewall portions of the tire.

Additionally, the pneumatic tire 1 includes a plurality of circumferential main grooves 21 to 23 extending in the tire circumferential direction; and a plurality of land portions 31 to 34 partitioned and formed by the circumferential main grooves 21 to 23 in the tread portion (see FIG. 2). Note that "circumferential main grooves" refers to circumferential grooves having a groove width of 3 mm or greater. Additionally, the land portions 31 to 34 may be rows of blocks (see FIG. 2) or may be ribs (not illustrated).

A region corresponding to 35% of a tread pattern developed width PDW from a first tread edge is called an "inner side region". A region corresponding to 35% of a tread pattern developed width PDW from a second tread edge is called an "outer side region". Note that differences in the configurations of the inner side region and the outer side region are described later. The tread pattern developed width PDW is the linear distance in a developed drawing between the two edges of the tread-patterned portion of the tire mounted on a standard rim to which a standard inner pressure is applied and no load is applied.

Additionally, the pneumatic tire 1 has an indicator designating a mounting direction (not illustrated) on a vehicle wherein the inner side region is on an inner side in a vehicle width direction. Note that the indicator of the mounting direction can be displayed, for example, by marks or recesses and protrusions provided on the side wall portion of the tire, or in a catalog that is attached to the tire.

Moreover, the left and right circumferential main grooves 21 and 23 outermost in the tire width direction are called "outermost circumferential main grooves." Additionally, land portions 31 and 34 on the outer side in the tire width direction that are partitioned and formed by the left and right outermost circumferential main grooves 21 and 23 are called shoulder land portions, and the land portions 32 and 33 on the inner side in the tire width direction are called center land portions.

For example, with the configuration of FIG. 2, the pneumatic tire 1 has three of the circumferential main grooves 21 to 23. Additionally, the center circumferential main groove 22 is disposed on a tire equatorial plane CL, and the left and right circumferential main grooves 21 and 23 are disposed so as to be left-right symmetric around the tire equatorial plane CL. Moreover, two center land portions 32 and 33 and a pair of left and right shoulder land portions 31 and 34 are partitioned by these circumferential main grooves 21 to 23. Here, the three circumferential main grooves 21 to 23 and the four land portions 31 to 34 are called, in order from an inner side in the vehicle width direction toward an outer side in the vehicle width direction, a first land portion 31, a first circumferential main groove 21, a second land portion 32, a second circumferential main groove 22, a third land portion 33, a third circumferential main groove 23, and a fourth land portion 34.

Sipe Configuration and Pitch Number of the Lug Grooves

With the pneumatic tire 1, each of the land portions 31 to 34 has a plurality of sipes 312 to 342, respectively (see FIG. 2). Moreover, not less than 90% of the sipes 312 and 322 disposed in the inner side region are constituted by two-dimensional sipes and not less than 90% of the sipes 332 and 342 disposed in the outer side region are constituted by three-dimensional sipes.

Here, "sipes" refers to cuts formed in a land portion. "Two-dimensional sipes" refers to sipes that have a sipe wall face with a linear form (when viewed as a cross-section from a direction perpendicular to a sipe length direction). "Three-dimensional sipes" refers to sipes that have a sipe wall face with a form bending in a sipe width direction when viewed, as a cross-section from a direction perpendicular to the sipe length direction). Compared to the two-dimensional sipes, the three-dimensional sipes have a greater mating force between opposing sipe wall faces and, therefore, act to reinforce rigidity of the land portions.

For example, with the configuration of FIG. 2, the land portions 31 to 34 have the plurality of sipes 312 to 342, respectively. Additionally, the sipes 312 to 342 have a straight form extending in the tire width direction, and are each disposed parallelly in the tire circumferential direction and at a predetermined pitch. Moreover, the sipes 312 to 342 have a closed structure, each terminating within the land portions 31 to 34. Furthermore, the sipes 312 of the first land portion 31 and the sipes 322 of the second land portion 32 are all two-dimensional sipes, and the sipes 332 of the third land portion 33 and the sipes 342 of the fourth land portion 34 are all three-dimensional sipes. Thus, due to a difference in rigidity between the two-dimensional sipes 312 and 322 and the three-dimensional sipes 332 and 342, the rigidity of the first land portion 31 and the second land portion 32 positioned in the inner side region is set to be low and the rigidity of the third land portion 33 and the fourth land portion 34 positioned in the outer side region is set to be high.

Additionally, with the pneumatic tire 1, the left and right shoulder land portions 31 and 34 have a plurality of lug grooves 311 and 341, respectively, arranged in the tire circumferential direction (see FIG. 2).

Here, "lug grooves" refers to grooves extending in the tire width direction. The lug grooves may have either an open structure or a semi-closed structure. When the lug grooves have an open structure, the land portions form block rows; and when the lug grooves have a semi-closed structure, the land portions form ribs.

For example, with the configuration of FIG. 2, the land portions 31 to 34 have a plurality of lug grooves 311 to 341, respectively, extending in the tire width direction. These lug grooves 311 to 341 are disposed at a predetermined pitch in the tire circumferential direction. Moreover, lug grooves 321 of the second land portion 32 and lug grooves 331 of the third land portion 33 each have an open structure, and cross the second land portion 32 and the third land portion 33 in the tire width direction so as to open to each of the left and right edges thereof. As a result, the second land portion 32 and the third land portion 33 are divided in the tire circumferential direction and a row of blocks is formed. On the other hand, lug grooves 311 of the first land portion 31 and lug grooves 341 of the fourth land portion 34 have a semi-closed structure, and have an end portion that is open at the tread edge on the outer side in the tire width direction and an end portion that terminates within the land portions on the inner side in the tire width direction. Thus, the first land portion 31 and the fourth land portion 34 form a rib that is continuous in the tire circumferential direction.

Additionally, with the pneumatic tire 1, a pitch number $N_{in}$ of the lug grooves 311 in the shoulder land portion 31 on the inner side region side and a pitch number $N_{out}$ of the lug grooves 341 in the shoulder land portion 34 on the outer side region side have a relationship such that $N_{in} > N_{out}$. The pitch number of the lug grooves is defined as a total number of the lug grooves that are open to the tire ground contact edge T, throughout an entire circumference of the tire. Thus, when considering the lug grooves that are open to the tire ground contact edge T, a total number of the lug grooves 311 in the shoulder land portion 31 on the inner side region side is greater than a total number of the lug grooves 341 in the shoulder land portion 34 on the outer side region side.

Note that the tire ground contact edge T is designated at a contact surface between a tire and a flat plate in a configuration in which the tire is mounted on a standard rim, filled to a prescribed internal pressure, placed perpendicularly with respect to the flat plate in a static state, and loaded with a load corresponding to a prescribed load.

For example, with the configuration of FIG. 2, a disposal pitch of the lug grooves 311 in the shoulder land portion 31 on the inner side region side is set to be narrower than a disposal pitch of the lug grooves 341 in the shoulder land portion 34 on the outer side region side. Additionally, a disposal pitch of the lug grooves 321 in the center land portion 32 on the inner side region side is set to be narrower than a disposal pitch of the lug grooves 331 in the center land portion 33 on the outer side region side. As a result, a difference ($N_{in} > N_{out}$) in pitch numbers $N_{in}$ and $N_{out}$ is provided between the land portions 31 and 32 in the region on the inner side in the tire width direction and the land portions 33 and 34 in the region on the outer side in the tire width direction, when divided by the tire equatorial plane CL. Thus, due to a difference in the pitch numbers between the lug grooves 311 to 341, the rigidity of the first land portion 31 and the second land portion 32 positioned in the inner side region is set to be low and the rigidity of the third land portion 33 and the fourth land portion 34 positioned in the outer side region is set to be high.

With the configuration described above, the two-dimensional sipes 312 and 322 are disposed in the inner side region, and the three-dimensional sipes 332 and 342 are disposed in the outer side region. Therefore, the rigidity in the inner side region is set to be low and the rigidity in the outer side region is set to be high (see FIG. 2). The pitch number $N_{in}$ of the lug grooves 311 in the shoulder land portion 31 on the inner side region side and the pitch number $N_{out}$ of the lug grooves 341 in the shoulder land portion 34 on the outer side region side have a relationship such that $N_{in} > N_{out}$. Therefore, rigidity of the inner side region is set to be low and rigidity of the outer side region is set to be high. Thus, synergistic lowering of the rigidity in the inner side region occurs and synergistic increasing of the rigidity in the outer side region occurs. As a result, when the pneumatic tire 1 is mounted on a vehicle such that the inner side region is on an inner side in the vehicle width direction, the inner side region will contribute greatly to enhancing snow steering stability (turning on snow) and the outer side region will contribute greatly to enhancing dry steering stability (high-speed lane changing performance). Therefore, both dry steering stability and snow steering stability of the tire are achieved at high levels.

Figure 3:
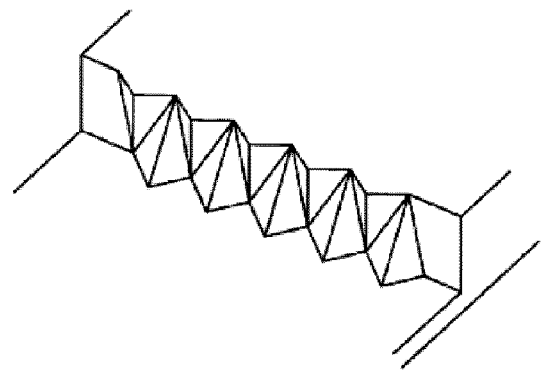
FIG. 3 is an explanatory drawing illustrating an example of a three-dimensional sipe.
Figure 4:
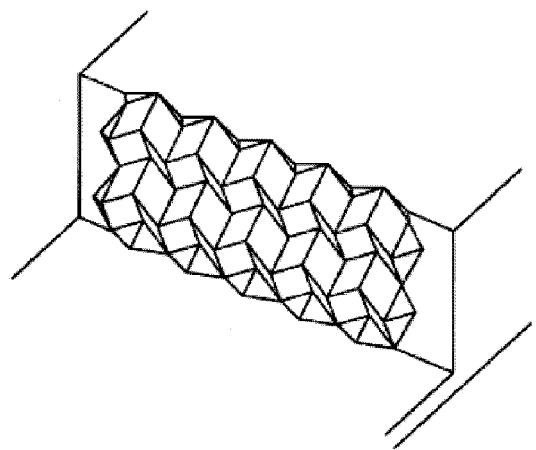
FIG. 4 is an explanatory drawing illustrating an example of a three-dimensional sipe.

FIGS. 3 and 4 are explanatory diagrams illustrating examples of the three-dimensional sipe. These drawings are perspective views of a wall face of the three-dimensional sipe.

With the three-dimensional sipe of FIG. 3, the sipe wall face has a structure in which pyramids and inverted pyramids are connected in the sipe length direction. In other words, the sipe wall face is formed by mutually offsetting pitches of a zigzag form of the tread surface side and a zigzag form of the bottom side in the tire width direction so that mutually opposing protrusions and recesses are formed between the zigzag forms of the tread surface side and the bottom side. Additionally, with these protrusions and recesses, when viewed in a tire rotating direction, the sipe wall face is formed by connecting a protrusion inflection point on the tread surface side to a recess inflection point on the bottom side, a recess inflection point on the tread surface side to a protrusion inflection point on the bottom side, and protrusion inflection points mutually adjacent to the protrusion inflection point on the tread surface side and the protrusion inflection point on the bottom side with ridge lines; and connecting these ridge lines with consecutive planes in the tire width direction. Additionally, a first face of the sipe wall face has a corrugated surface wherein convex pyramids and inverted pyramids thereof are arranged alternating in the tire width direction; and a second face of the sipe wall face has a corrugated surface wherein concave pyramids and inverted pyramids thereof are arranged alternating in the tire width direction. Furthermore, with the sipe wall face, at least the corrugated surfaces disposed at outermost sides of both ends of the sipe are oriented toward an outer side of the blocks. Note that examples of such a three-dimensional sipe include the technology described in Japanese Patent No. 3894743.

Additionally, with the three-dimensional sipe of FIG. 4, the sipe wall face has a structure in which a plurality of prism shapes having a block form are connected in the sipe depth direction and the sipe length direction while inclining with respect to the sipe depth direction. In other words, the sipe wall face has a zigzag form in the tread surface. Additionally, the sipe wall face has bent portions in at least two locations in the tire radial direction in the blocks that bend in the tire circumferential direction and are connected in the tire width direction. Moreover, these bent portions have a zigzag form that oscillates in the tire radial direction. Additionally, while, in the sipe wall face, the oscillation is constant in the tire circumferential direction, an inclination angle in the tire circumferential direction with respect to a normal line direction of the tread surface is configured so as to be smaller at a moiety on the sipe bottom side than at a moiety on the tread surface side; and the oscillation in the tire radial direction of the bent portion is configured so as to be greater at a moiety on the sipe bottom side than at a moiety on the tread surface side. Note that examples of such a three-dimensional sipe include the technology described in Japanese Patent No. 4316452.

With the configuration described above, the pitch number $N_{in}$ of the lug grooves 311 on the inner side region side and the pitch number $N_{out}$ of the lug grooves 341 on the outer side region side preferably have a relationship such that $64 \leq N_{in} \leq 78$, $54 \leq N_{out} \leq 68$, and $3 \leq N_{in} - N_{out} \leq 12$ are satisfied. As a result, the relationship between the pitch number $N_{in}$ of the lug grooves 311 on the inner side region side and the pitch number $N_{out}$ of the lug grooves 341 on the outer side region side will be made appropriate.

Additionally, with the configuration described above, a sipe density $D_{in}$ of the inner side region and a sipe density $D_{out}$ of the outer side region preferably have a relationship such that $1.2 \leq D_{in}/D_{out} \leq 2.0$ (not illustrated). That is, the sipe density $D_{in}$ of the inner side region is preferably greater than the sipe density $D_{out}$ of the outer side region. As a result, the relationship between the sipe density $D_{in}$ of the inner side region and the sipe density $D_{out}$ of the outer side region will be made appropriate.

Here, "sipe density" refers to a ratio of sipe length to the ground contact area of a land portion. Sipe length can be increased by providing the sipes with a bending form. Additionally, sipe density can be easily, adjusted by, for example, adjusting the sipe length, number of sipes, and the like.

With the configuration described above, a groove area ratio $S_{in}$ of the inner side region and a groove area ratio $S_{out}$ of the outer side region in a tire ground contact patch have a relationship such that $1.2 \leq S_{out}/S_{in} \leq 2.0$, and a total groove area ratio $S_t$ in the tire ground contact patch is within a range $0.25 \leq S_t \leq 0.38$. As a result, the ratio $S_{out}/S_{in}$ of the groove area ratio $S_{out}$ of the outer side region to the groove area ratio $S_{in}$ of the inner side region, along with the total groove area ratio $S_t$, are made appropriate.

Additionally, with the configuration described above, a groove width W1 of the lug grooves 311 of the inner side region (not illustrated) and a groove width W2 of the lug grooves 341 of the outer side region (not illustrated) preferably have a relationship such that $0.5 \text{ mm} \leq W1-W2 \leq 2.0 \text{ mm}$. In this configuration, the lug grooves 311 in the inner side region will be wide and, therefore, the snow performance of the tire will be enhanced. Also, the lug grooves 341 in the outer side region will be narrow and, therefore, the dry steering stability of the tire will be enhanced.

Additionally, with the configuration described above, a groove depth Hd1 of the lug grooves 311 in the inner side region and a groove depth Hd2 of the lug grooves 341 of the outer side region preferably have a relationship such that $1.0 \text{ mm} \leq Hd1-Hd2 \leq 3.0 \text{ mm}$. In this configuration, the lug grooves 311 in the inner side region will be deep and, therefore, the snow performance of the tire will be enhanced. Also, the lug grooves 341 in the outer side region will be deep and, therefore, the snow performance of the tire will be enhanced.

Here, "groove area ratio" is defined as groove area/(groove area+ground contact area). "Groove area" refers to the opening area of the grooves in the contact patch. "Groove" refers to the circumferential grooves and lug grooves in the tread portion and does not include sipes and kerfs. "Ground contact area" refers to the contact area between the tire and the contact patch. Note that the groove area and the ground contact area are measured at a contact surface between a tire and a flat plate in a configuration in which the tire is mounted on a standard rim, filled to a prescribed internal pressure, placed perpendicularly with respect to the flat plate in a static state, and loaded with a load corresponding to a prescribed load. Note that the tire ground contact patch refers to a contact surface between a tire and a flat plate in a configuration in which the tire is mounted on a standard rim, filled to a prescribed internal pressure, placed perpendicularly with respect to the flat plate in a static state, and loaded with a load corresponding to a prescribed load.

"Standard Rim," as used herein, refers to the "Standard Rim" defined by JATMA, "Design Rim" defined by TRA, or the "Measuring Rim" defined by ETRTO. Additionally "prescribed inner pressure" includes the "maximum air pressure" defined by JATMA, the maximum value in "TIRE LOAD LIMITS AT VARIOUS COLD INFLATION PRESSURES" defined by TRA, or the "INFLATION PRESSURES" defined by ETRTO. The prescribed load includes the "maximum load capacity" defined by JATMA, the maximum value in "TIRE LOAD LIMITS AT VARIOUS COLD INFLATION PRESSURES" defined by TRA, or the "LOAD CAPACITY" defined by ETRTO. However, with JATMA, in the case of passenger car tires, the prescribed internal pressure is an air pressure of 180 kPa, and the stipulated load is 88% of the maximum load capacity.

Modified Example 1

Figure 5:
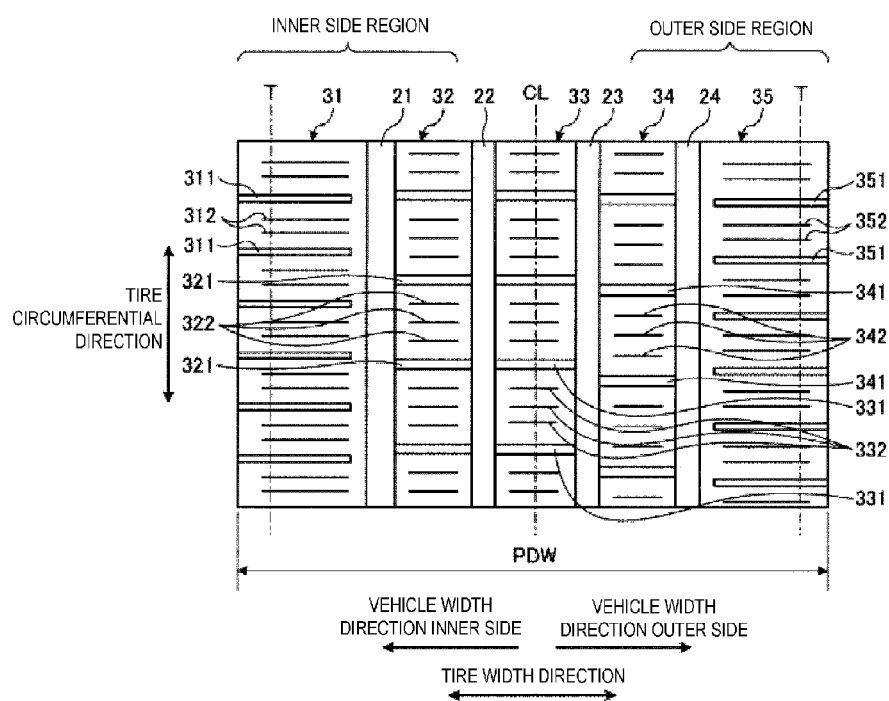
FIG. 5 is an explanatory view illustrating a Modified Example 1 of the pneumatic tire depicted in FIG. 1.

FIG. 5 is an explanatory view illustrating Modified Example 1 of the pneumatic tire depicted in FIG. 1.

With the configuration of FIG. 2, three of the circumferential main grooves 21 to 23 are disposed. However, the configuration is not limited to such and three or more of the circumferential main grooves 21 to 24 may be disposed (see FIG. 5).

For example, with the Modified Example 1 of FIG. 5, the pneumatic tire 1 has four of the circumferential main grooves 21 to 24. Additionally, the circumferential main grooves 21, 22, 23, and 24 are disposed, two on each side so as to be left-right symmetric around the tire equatorial plane CL. Moreover, three center land portions 32 to 34 and a pair of left and right shoulder land portions 31 and 35 are partitioned by these circumferential main grooves 21 to 24. Here, the four circumferential main grooves 21 to 24 and the five land portions 31 to 35 are called, in order from the inner side in the vehicle width direction toward the outer side in the vehicle width direction, a first land portion 31, a first circumferential main groove a second land portion 32, a second circumferential main groove 22, a third land portion 33, a third circumferential main groove 23, a fourth land portion 34, a fourth circumferential main groove 24, and a fifth land portion 35.

Additionally, the third land portion 33 is on the tire equatorial plane CL, and the boundaries of the inner side region and the outer side region are disposed on the second land portion 32 and the fourth land portion 34, respectively. Thus, the first land portion 31 and a portion of the second land portion 32 belong to the inner side region and a portion of the fourth land portion 34 and the fifth land portion 35 belong to the outer side region. Additionally, each of the second land portion 32 to the fourth land portion 34 has a plurality of lug grooves 321, 331, and 341, respectively, and is configured as a row of blocks.

Additionally, each of the land portions 31 to 35 has a plurality of sipes 312, 322, 332, 342, and 352, respectively. All of the sipes 312 and 322 disposed in the first land portion 31 and the second land portion 32 in the inner side region are two-dimensional sipes and all of the sipes 342 and 352 disposed in the fourth land portion 34 and the fifth land portion 35 in the outer side region are three-dimensional sipes.

Note that the sipes 332 disposed in the third land portion 33 located on the tire equatorial plane CL may be two-dimensional sipes or three-dimensional sipes. Alternatively, a combination of two-dimensional sipes and three-dimensional sipes may be disposed. With a configuration in which all of the sipes 332 disposed in the third land portion 33 are two-dimensional sipes, the snow steering stability of the tire will be enhanced. Conversely, in a configuration in which all the sipes 332 are three-dimensional sipes, the dry steering stability of the tire will be enhanced.

Additionally, each of the land portions 31 to 35 has a plurality of lug grooves 311 to 351, respectively. Moreover, the pitch number $N_{in}$ of the lug grooves 311 in the shoulder land portion (the first land portion) 31 on the inner side region side and a pitch number $N_{out}$ of the lug grooves 351 in the shoulder land portion (the fifth land portion) 35 on the outer side region side have a relationship such that $N_{in} > N_{out}$. The pitch number of the lug grooves 321 in the second land portion 32 on the inner side region side is greater than the pitch number of the lug grooves 341 in the fourth land portion 34 on the outer side region. As a result, a difference ($N_{in} > N_{out}$) in the pitch numbers $N_{in}$ and $N_{out}$ is provided between the land portions 31 and 32 in the region on the inner side in the tire width direction and the land portions 34 and 35 in the region on the outer side in the tire width direction, when divided by the tire equatorial plane CL.

With the pneumatic tire 1 of FIG. 5, each of the center land portions 32 to 34 has the open-structure lug grooves 321 to 341, respectively and, thereby are each formed as a row of blocks. Additionally, the left and right shoulder land portions 31 and 35 each have semi-closed lug grooves 311 and 351 and, thereby are formed into ribs. However, the configuration is not limited thereto, and any of the land portions may have lug grooves with an open structure, or a semi-closed structure, or lug grooves with a closed structure (not illustrated). Moreover, each of the land portions may be formed as a row of blocks or as a rib (not illustrated). Furthermore, any of the land portions may have inclined grooves (not illustrated).

Additionally, with the pneumatic tire 1 of FIG. 5, the sipes 312 to 352 of the land portions 31 to 35 are all closed sipes. However, the configuration is not limited thereto, and any of the sipes 312 to 352 may be open sipes or semi-closed sipes (not illustrated).

Modified Example 2

Figure 6:
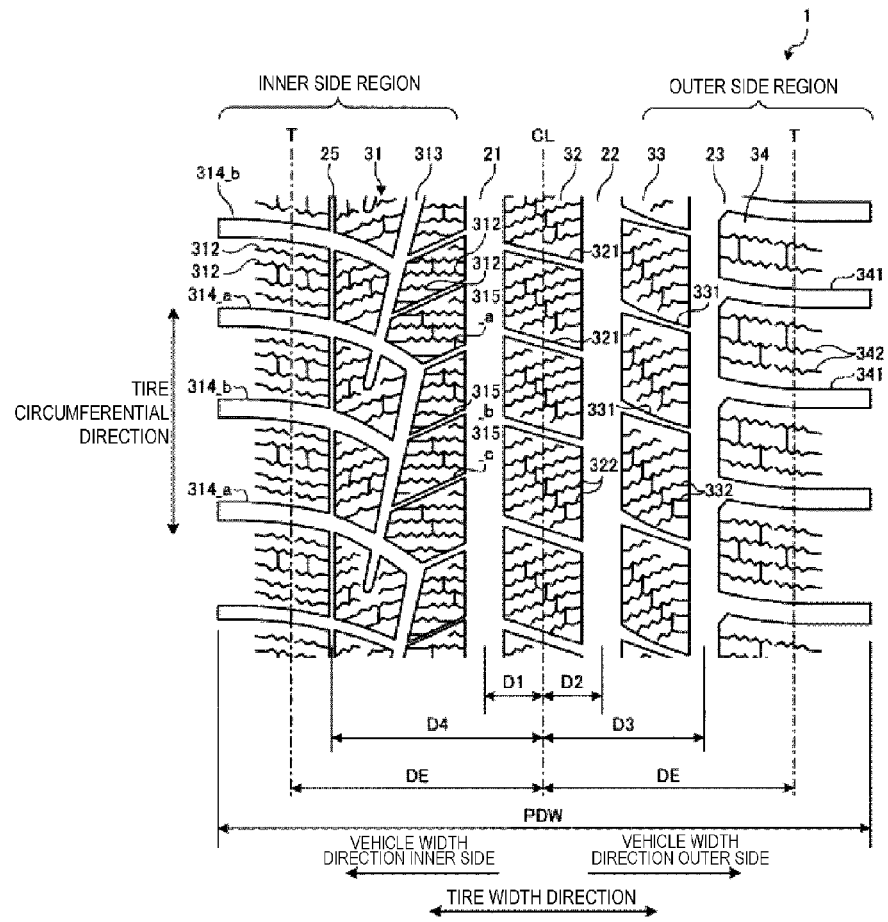
FIG. 6 is an explanatory view illustrating a Modified Example 2 of the pneumatic tire depicted in FIG. 1.

FIG. 6 is an explanatory view illustrating Modified Example 2 of the pneumatic tire depicted in FIG. 1. This drawing illustrates a winter tire for use on passenger cars that has an asymmetric tread pattern.

With the configuration of FIG. 2, the pneumatic tire 1 has three of the circumferential main grooves 21 to 23, the center circumferential main groove 22 is disposed on a tire equatorial plane CL, and the left and right circumferential main grooves 21 and 23 are disposed so as to be left-right symmetric around the tire equatorial plane CL. However, the configuration is not limited to such, and the circumferential main grooves may be disposed in an asymmetric manner (see FIG. 6).

For example, with the Modified Example 2 of FIG. 6, the pneumatic tire 1 includes three of the circumferential main grooves 21 to 23 extending in the tire circumferential direction, and four of the land portions 31 to 34 partitioned and formed by the circumferential main grooves 21 to 23, in the tread portion. Additionally, one of the circumferential main grooves 21 is disposed in a first region demarcated by the tire equatorial plane CL and two of the circumferential main grooves 22 and 23 are disposed in a second region. The left and right shoulder land portions 31 and 34 are formed, respectively, from the first land portion 31 and the fourth land portion 34 that are partitioned by the outermost circumferential main grooves 21 and 23.

Additionally, a ground contact width of the first land portion 31 in the inner side region is greater than a ground contact width of the fourth land portion 34 in the outer side region. Additionally, the first land portion 31 includes a plurality of inclined grooves 313 inclining with respect to the tire circumferential direction, a plurality of first lug grooves 314_a and 314_b extending in the tire width direction from an outer side of the tire ground contact patch so as to communicate with the inclined grooves 313, and a plurality of second lug grooves 315_a to 315_c extending in the tire width direction so as to connect the inclined grooves 313 and the first circumferential main groove 21. Additionally, three of the first lug grooves 314 are in communication with one of the inclined grooves 313. Note that a number of the first lug grooves 314 is preferably in a range of not less than 3 and not more than 6.

Additionally, with the Modified Example 2 of FIG. 6, a disposal pitch in the tire circumferential direction of the second lug grooves 315_a to 315_c is narrower than a disposal pitch in the tire circumferential direction of the first lug grooves 314_a and 314_b. As a result, water discharge properties and snow traction properties of the first land portion 31 are increased. Additionally, an angle of inclination (p (not illustrated) of the inclined grooves 313 with respect to the tire circumferential direction is within a range 10≤φ≤40°. As a result, the angle of inclination φ of the inclined grooves 313 is made appropriate. Additionally, each of all or a portion of the second lug grooves 315_b and 315_c among the plurality of second lug grooves 315_a to 315_c includes raised bottom portions (not illustrated) where groove bottoms are raised. As a result, the raised bottom portions will reinforce the rigidity of the land portion 31.

Additionally, a groove width W3 (not illustrated) of the second lug grooves 315_a to 315_c is set to be in a range 2 mm≤W3≤6 mm. As a result, the groove width W3 of the second lug grooves 315_a to 315_c is made appropriate. Moreover, the second land portion 32 and the third land portion 33 each have a plurality of lug grooves 321 and 331 that penetrate the land portions 32 and 33 in the tire width direction, respectively. Additionally, each of all or a portion of the lug grooves among the plurality of lug grooves 321 and 331 includes raised bottom portions (not illustrated) where groove bottoms are raised. As a result, the raised bottom portions will reinforce the rigidity of the land portions 32 and 33.

Additionally, from the tire equatorial plane CL, a distance DE to a tire ground contact edge T, a distance D1 to (a groove center line of) the first circumferential main groove 21 partitioning the first land portion 31, and a distance D3 to the third circumferential main groove 23 partitioning the fourth land portion 34 have relationships such that $0.10 \leq D1/DE \leq 0.30$ (preferably $0.15 \leq D1/DE \leq 0.25$) and $0.55 \leq D3/DE \leq 0.75$. Here, it is assumed that the first circumferential main groove 21 and the third circumferential main groove 23 are disposed so as to sandwich the tire equatorial plane CL. As a result, the relationship between the ground contact width of the left and right first land portion 31 and fourth land portion 34 is made appropriate. Note that with the Modified Example 2 of FIG. 6, a distance D2 to the second circumferential main groove 22 from the tire equatorial plane CL is such that D2=D1.

Additionally, the first land portion 31 has a circumferential narrow and shallow groove 25 disposed between the inclined grooves 313 and the tire ground contact edge T and extending in the tire circumferential direction. A groove width W4 (not illustrated) and a groove depth Hd3 (not illustrated) of the circumferential narrow and shallow groove 25 are set to be in ranges 2 mm$\leq$W4$\leq$4 mm and 2 mm$\leq$Hd3$\leq$4 mm. As a result, the snow traction properties will be enhanced due to edge components of the circumferential narrow and shallow groove 25. Note that with the Modified Example 2 of FIG. 6, a distance D4 to the circumferential narrow and shallow groove 25 from the tire equatorial plane CL is such that $0.50 \leq D4/DE \leq 0.90$.

With the Modified Example 2 of FIG. 6, as described above, the first land portion 31 in the inner side region has a wide structure and the first land portion 31 includes the plurality of inclined grooves 313, the plurality of first lug grooves 314_a and 314_b, and the plurality of second lug grooves 315_a to 315_c. Therefore, the rigidity of this wide first land portion 31 is reduced, and the water discharge properties of the first land portion 31 are ensured. Furthermore, because three or more of the first lug grooves 314_a and 314_b are in communication with one of the inclined grooves 313, the water discharge properties and the snow traction properties of the first land portion 31 are enhanced. As a result, the dry performance, the wet performance, and the snow performance of the tire can be achieved.

Additionally, with the Modified Example 2 of FIG. 6, the land portions 31 to 34 each have the plurality of sipes 312 to 342. Each block of the first land portion 31 partitioned by the inclined grooves 313, the first lug grooves 314_a and 314_b, and the second lug grooves 315_a to 315_c has a plurality of sipes 312. Moreover, not less than 90% of the sipes 312 disposed in the first land portion 31 are constituted by two-dimensional sipes and not less than 90% of the sipes 332 and 342 disposed in the third land portion 33 and the fourth land portion 34 are constituted by three-dimensional sipes. As a result, the rigidity of the inner side region is set to be low and the rigidity of the outer side region is set to be high.

Note that the sipes 322 disposed in the second land portion 32 located on the tire equatorial plane CL may be two-dimensional sipes or three-dimensional sipes. Alternatively, a combination of two-dimensional sipes and three-dimensional sipes may be disposed. With a configuration in which all of the sipes 322 disposed in the second land portion 32 are two-dimensional sipes, the snow steering stability of the tire will be enhanced. Conversely, in a configuration in which all the sipes 322 are three-dimensional sipes, the dry steering stability of the tire will be enhanced.

Additionally, the pitch number $N_{in}$ of the first lug grooves 314_a and 314_b that are open to the tire ground contact edge T in the first land portion 31 and the pitch number $N_{out}$ of the lug grooves 341 that are open to the tire ground contact edge T in the fourth land portion 34 have a relationship such that $N_{in} > N_{out}$. As a result, a difference ($N_{in} > N_{out}$) in the pitch numbers $N_{in}$ and $N_{out}$ is provided between the shoulder land portion 31 in the inner side region (the first land portion) and the shoulder land portion 34 in the outer side region (the fourth land portion). As a result, the rigidity of the inner side region is set to be low and the rigidity of the outer side region is set to be high.

Additionally, with the Modified Example 2 of FIG. 6, the pneumatic tire 1 has an indicator designating a mounting direction on a vehicle in which the first land portion 31 having a wide ground contact width is on the inner side in the vehicle width direction. With typical high-performance vehicles, a configuration is used in which a large negative camber angle is set and, therefore, tire ground contact length of the inner side region in the vehicle width direction increases. Therefore, the snow traction properties are effectively enhanced due to the pneumatic tire 1 being mounted on the vehicle such that the first land portion 31 is on the inner side in the vehicle width direction. Additionally, as described above, the rigidity of the first land portion 31 is low and, therefore, by mounting the tire so that the first land portion 31 is on the inner side in the vehicle width direction, the snow steering stability of the tire is further enhanced.

Note that the tire ground contact width is measured at a contact surface between a tire and a flat plate in a configuration in which the tire is mounted on a standard rim, filled to a prescribed internal pressure, placed perpendicularly with respect to the flat plate in a static state, and loaded with a load corresponding to a prescribed load.

Effects

As described above, the pneumatic tire 1 includes the plurality of circumferential main grooves 21 to 23 extending in the tire circumferential direction; and the plurality of land portions 31 to 34 partitioned and formed by the circumferential main grooves 21 to 23 in the tread portion (see FIG. 2). Additionally, each of these land portions 31 to 34 has a plurality of sipes 312 to 342, respectively. Moreover, not less than 90% of the sipes 312 and 322 disposed in the inner side region are constituted by two-dimensional sipes and not less than 90% of the sipes 332 and 342 disposed in the outer side region are constituted by three-dimensional sipes. The left and right shoulder land portions 31 and 34 each have a plurality of lug grooves 311 and 341 arranged in the tire circumferential direction. A pitch number $N_{in}$ of the lug grooves 311 in the shoulder land portion 31 on the inner side region side and a pitch number $N_{out}$ of the lug grooves 341 in the shoulder land portion 34 on the outer side region side have a relationship such that $N_{in} > N_{out}$.

With the configuration described above, the two-dimensional sipes 312 and 322 are disposed in the inner side region, and the three-dimensional sipes 332 and 342 are disposed in the outer side region. Therefore, the rigidity in the inner side region is set to be low and the rigidity in the outer side region is set to be high (see FIG. 2). The pitch number $N_{in}$ of the lug grooves 311 in the shoulder land portion 31 on the inner side region side and the pitch number $N_{out}$ of the lug grooves 341 in the shoulder land portion 34 on the outer side region side have a relationship such that $N_{in} > N_{out}$. Therefore, rigidity of the inner side region is set to be low and rigidity of the outer side region is set to be high. Thus, synergistic lowering of the rigidity in the inner side region occurs and synergistic increasing of the rigidity in the outer side region occurs. As a result, when a pneumatic tire 1 is mounted on a vehicle such that the inner side region is on an inner side in a vehicle width direction, the inner side region will contribute greatly to enhancing snow steering stability and the outer side region will contribute greatly to enhancing dry steering stability. Such a configuration is advantageous because both dry steering stability and snow steering stability of the tire are achieved at high levels.

Additionally, with the pneumatic tire 1, the pitch number $N_{in}$ of the lug grooves 311 on the inner side region side and the pitch number $N_{out}$ of the lug grooves 341 on the outer side region side have a relationship such that $64 \leq N_{in} \leq 78$, $54 \leq N_{out} \leq 68$, and $3 \leq N_{in} - N_{out} \leq 12$ are satisfied. Such a configuration is advantageous because the relationship between the pitch number $N_{in}$ of the lug grooves 311 on the inner side region side and the pitch number $N_{out}$ of the lug grooves 341 on the outer side region side will be made appropriate, and the dry steering stability and the snow steering stability of the tire are achieved at higher levels.

With the pneumatic tire 1, the sipe density $D_{in}$ of the inner side region and the sipe density $D_{out}$ of the outer side region have a relationship such that $1.2 \leq D_{in}/D_{out} \leq 2.0$. With such a configuration, the ratio $D_{in}/D_{out}$ of the sipe density $D_{in}$ of the inner side region to the sipe density $D_{out}$ of the outer side region is made appropriate. Such a configuration is advantageous because both dry steering stability and snow steering stability of the tire are achieved at higher levels.

With the pneumatic tire 1, the groove area ratio $S_{in}$ of the inner side region and the groove area ratio $S_{out}$ of the outer side region in the tire ground contact patch have a relationship such that $1.2 \leq S_{out}/S_{in} \leq 2.0$, and the total groove area ratio $S_t$ in the tire ground contact patch is within the range $0.25 \leq S_t \leq 0.38$. With the configuration described above, the ratio $S_{out}/S_{in}$ of the groove area ratio $S_{out}$ in the outer side region to the groove area ratio $S_{in}$ in the inner side region, along with the total groove area ratio $S_t$ are made appropriate. Such a configuration is advantageous because both dry steering stability and snow steering stability of the tire are achieved at higher levels.

With the pneumatic tire 1, the groove width W1 of the lug grooves 311 in the inner side region and the groove width W2 of the lug grooves 341 in the outer side region have a relationship such that 0.5 mm≤W1−W2≤2.0 mm. In this configuration, the lug grooves 311 in the inner side region will be wide and, therefore, the snow performance of the tire will be enhanced. Also, the lug grooves 341 in the outer side region will be narrow and, therefore, the dry steering stability of the tire will be enhanced.

Additionally, with the pneumatic tire 1, the groove depth Hd1 of the lug grooves 311 of the inner side region and the groove depth Hd2 of the lug grooves 341 of the outer side region have a relationship such that 1.0 mm≤Hd1−Hd2≤3.0 mm. This configuration is advantageous because the lug grooves 311 in the inner side region will be deep and, therefore, the snow performance of the tire will be enhanced; and because the lug grooves 341 in the outer side region will be deep and, therefore, the snow performance of the tire will be enhanced.

Additionally, the pneumatic tire 1 includes three of the circumferential main grooves 21 to 23 and four of the land portions 31 to 34 in the tread portion (see FIG. 6). Additionally, the ground contact width of the first land portion 31 on the ground contact edge T in the inner side region is greater than the ground contact width of the fourth land portion 34 on the ground contact edge T in the outer side region. Additionally, the first land portion 31 includes the plurality of inclined grooves 313 inclining with respect to the tire circumferential direction, the plurality of first lug grooves 314_a and 314_b extending in the tire width direction from the outer side of the tire ground contact patch so as to communicate with the inclined grooves 313, and the plurality of second lug grooves 315_a to 315_c extending in the tire width direction so as to connect the inclined grooves 313 and the circumferential main groove 21. Furthermore, three or more of the first lug grooves 314_a and 314_b are in communication with one of the inclined grooves 313.

With the configuration described above, the first land portion 31 in the inner side region has a wide structure and the first land portion 31 includes the plurality of inclined grooves 313, the plurality of first lug grooves 314_a and 314_b, and the plurality of second lug grooves 315_a to 315_c. Therefore, the rigidity of this wide first land portion 31 is reduced, and the water discharge properties of the first land portion 31 are ensured. Furthermore, because three or more of the first lug grooves 314_a and 314_b are in communication with one of the inclined grooves 313, the water discharge properties and the snow traction properties of the first land portion 31 are enhanced. Such a configuration is advantageous because the dry performance, the wet performance, and the snow performance of the tire can be achieved.

Additionally, the pneumatic tire 1 has the indicator designating the mounting direction (see FIG. 2) on a vehicle wherein the inner side region is on the inner side in the vehicle width direction. With the configuration described above, the inner side region having the low rigidity is disposed on the inner side in the vehicle width direction and the outer side region having the high rigidity is disposed on the outer side in the vehicle width direction. Such a configuration is advantageous because the inner side region will contribute greatly to the snow steering stability, the outer side region will contribute greatly to the dry, steering stability, and both dry steering stability and snow steering stability of the tire will be achieved at high levels.

Examples

FIGS. 7a-7b include a table showing the results of performance testing of pneumatic tires according to the embodiments of the present technology.

In the performance testing, a plurality of mutually differing pneumatic tires were evaluated for (1) dry steering stability and (2) snow steering stability (see FIGS. 7a-7b). In these performance tests, pneumatic tires with a tire size of 235/45R19 were assembled on rims with a rim size of 19×8J, inflated to an air pressure of 250 kPa, and loaded with 85% of a "LOAD CAPACITY" stipulated by ETRTO. A sedan type four-wheel drive vehicle with an engine displacement of 3.0 L was used as the test vehicle.

(1) In the evaluations for dry steering stability, the test vehicle on which the pneumatic tires were mounted was driven at a speed of from 60 km/h to 240 km/h on a flat circuit test course. Then the test driver performed a sensory evaluation regarding steering while lane changing and cornering and stability while traveling forward. Results of the evaluations were indexed and the index value of the pneumatic tire of Comparative Example 1 was set as the standard score (100). Higher scores were preferable.

(2) In the evaluations for snow steering stability, the test vehicle on which the pneumatic tires were mounted was driven at a speed of 40 km/h on a handling course in a snow road testing facility, and the test driver performed a sensory evaluation. Results of the evaluations were indexed and the index value of the pneumatic tire of Comparative Example 1 was set as the standard score (100). Higher scores were preferable.

The pneumatic tires 1 of Working Examples 1 to 7 had the structure of FIG. 1 and the tread pattern of FIG. 2, and included three circumferential main grooves 21 to 23 and four land portions 31 to 34 in the tread portion. Additionally, all of the sipes 312 and 322 in the first land portion 31 and the second land portion 32 in the inner side region were constituted by two-dimensional sipes, and all of the sipes 332 and 342 in the third land portion 33 and the fourth land portion 34 in the outer side region were constituted by three-dimensional sipes. The left and right shoulder land portions 31 and 34 each had a plurality of lug grooves 311 and 341 arranged in the tire circumferential direction. The pitch number $N_{in}$ of the lug grooves 311 in the shoulder land portion 31 on the inner side region side and a pitch number $N_{out}$ of the lug grooves 341 in the shoulder land portion 34 on the outer side region side had a relationship such that $N_{in} > N_{out}$. Additionally, the relationship between the sipe density $D_{in}$ of the inner side region and the sipe density $D_{out}$ of the outer side region was adjusted. Additionally, the groove area ratio $S_{in}$ in the inner side region and the groove area ratio $S_{out}$ in the outer side region of the tire ground contact patch were adjusted by adjusting the groove area or the disposal pitch of the lug grooves of the land portions 31 to 34.

Additionally, the pneumatic tire 1 of Working Example 8 had the tread pattern of FIG. 6, or, all of the sipes 312 of the first land portion 31 were constituted by two-dimensional sipes and all of the sipes 322 to 342 of the second land portion 32 to the fourth land portion 34 were constituted by three-dimensional sipes. The pitch number $N_{in}$ of the lug grooves 314_a and 314_b in the shoulder land portion 31 on the inner side region side and the pitch number $N_{out}$ of the lug grooves 341 in the shoulder land portion 34 on the outer side region side had a relationship such that $N_{in} > N_{out}$.

The pneumatic tires of the Conventional Examples included three circumferential main grooves and four land portions in the tread portion. Additionally, the sipes in each of the land portions were all two-dimensional sipes. The pitch number $N_{in}$ of the lug grooves in the shoulder land portion on the inner side region side and the pitch number $N_{out}$ of the lug grooves in the shoulder land portion on the outer side region side had a relationship such that $N_{in} > N_{out}$.

As is clear from the test results, with the pneumatic tires 1 of Working Examples 1 to 8, compared with the pneumatic tires of the Conventional Examples, the dry steering stability and the snow steering stability of the tires were enhanced (see FIGS. 7a-7b). Furthermore, in a comparison of Working Examples 1 to 4, it is clear that both the dry steering stability and the snow steering stability of the tire are achieved due to the ratio $D_{in}/D_{out}$ of the sipe density $D_{in}$ of the inner side region to the sipe density $D_{out}$ of the outer side region being made appropriate, and the ratio $S_{out}/S_{in}$ of the groove area ratio $S_{out}$ in the outer side region to the groove area ratio $S_{in}$ in the inner side region, along with the total groove area ratio $S_t$ being made appropriate. Additionally, in a comparison of Working Examples 1 and 5 to 7, it is clear that both the dry steering stability and the snow steering stability of the tire are achieved due to the relationship between the groove width W1 and the groove depth Hd1 of the lug grooves in the inner side region and the groove width W2 and the groove depth Hd2 of the lug grooves in the outer side region being made appropriate.

What is claimed is:

1. A pneumatic tire comprising a plurality of circumferential main grooves extending in a tire circumferential direction, and a plurality of land portions that are partitioned and formed by the circumferential main grooves in a tread portion, wherein, when a region corresponding to 35% of a tread pattern developed width from a first tread edge is called an inner side region, a region corresponding to 35% of the tread pattern developed width from a second tread edge is called an outer side region, the left and right circumferential main grooves outermost in a tire width direction are called outermost circumferential main grooves, and the land portions on the outer side in the tire width direction partitioned and formed by the left and right outermost circumferential main grooves are called shoulder land portions, the plurality of land portions each have a plurality of sipes, not less than 90% of the sipes disposed in the inner side region are constituted by two-dimensional sipes and not less than 90% of the sipes disposed in the outer side region are constituted by three-dimensional sipes, the two-dimensional sipes having a sipe wall face with a linear form when viewed as a cross-section from a direction perpendicular to a sipe length direction, and the three-dimensional sipes having a sipe wall face with a form bending in a sipe width direction when viewed as a cross-section from a direction perpendicular to a sipe length direction, the left and right shoulder land portions each have a plurality of lug grooves arranged in the tire circumferential direction, a pitch number $N_{in}$ of the lug grooves in the shoulder land portion on the inner side region side and a pitch number $N_{out}$ of the lug grooves in the shoulder land portion on the outer side region side have a relationship such that $N_{in} > N_{out}$, a groove area ratio $S_{in}$ of the inner side region and a groove area ratio $S_{out}$ of the outer side region in a tire ground contact patch have a relationship such that $1.2 \leq S_{out}/S_{in} \leq 2.0$, and a total groove area ratio $S_t$ in the tire ground contact patch is within a range $0.25 \leq S_t \leq 0.38$.

2. The pneumatic tire according to claim 1, wherein the pitch number $N_{in}$ of the lug grooves on the inner side region side and the pitch number $N_{out}$ of the lug grooves on the outer side region side have a relationship such that $64 \leq N_{in} \leq 78$, $54 \leq N_{out} \leq 68$, and $3 \leq N_{in} - N_{out} \leq 12$ are satisfied.

3. The pneumatic tire according to claim 1, wherein a sipe density $D_{in}$ of the inner side region and a sipe density $D_{out}$ of the outer side region have a relationship such that $1.2 \leq D_{in}/D_{out} \leq 2.0$.

4. The pneumatic tire according to claim 1, wherein a groove width W1 of the lug grooves in the inner side region and a groove width W2 of the lug grooves in the outer side region have a relationship such that $0.5 \text{ mm} \leq W1 - W2 \leq 2.0 \text{ mm}$.

5. The pneumatic tire according to claim 1, wherein each of the inner side region and the outer side region comprises lug grooves that open to a tire ground contact edge, and a groove depth Hd1 of the lug grooves in the inner side region and a groove depth Hd2 of the lug grooves in the outer side region have a relationship such that $1.0 \text{ mm} \leq Hd1 - Hd2 \leq 3.0 \text{ mm}$.

6. The pneumatic tire according to claim 1, comprising three of the circumferential main grooves and four of the land portions in a tread portion; wherein a ground contact width of the land portion on the ground contact edge of the inner side region is greater than a ground contact width of the land portion on the ground contact edge of the outer side region;

the land portions in the inner side region comprise a plurality of inclined grooves inclining with respect to the tire circumferential direction, a plurality of first lug grooves extending in a tire width direction from an outer side of the tire ground contact patch so as to communicate with the inclined grooves, and a plurality of second lug grooves extending in the tire width direction so as to connect the inclined grooves and the circumferential main groove; and not less than three of the first lug grooves are in communication with one of the inclined grooves.

7. The pneumatic tire according to claim 1, having an indicator designating a mounting direction on a vehicle wherein the inner side region is on an inner side in a vehicle width direction.

8. The pneumatic tire according to claim 1, wherein the pitch number $N_{in}$ of the lug grooves on the inner side region side and the pitch number $N_{out}$ of the lug grooves on the outer side region side have a relationship such that $64 \leq N_{in} \leq 78$, $54 \leq N_{out} \leq 68$, and $3 \leq N_{in} - N_{out} \leq 12$ are satisfied, and wherein a sipe density $D_{in}$ of the inner side region and a sipe density $D_{out}$ of the outer side region have a relationship such that $1.2 \leq D_{in}/D_{out} \leq 2.0$.

9. The pneumatic tire according to claim 8, wherein a groove width W1 of the lug grooves in the inner side region and a groove width W2 of the lug grooves in the outer side region have a relationship such that 0.5 mm<W1−W2<2.0 mm.

10. The pneumatic tire according to claim 9, wherein each of the inner side region and the outer side region comprises lug grooves that open to a tire ground contact edge, and a groove depth Hd1 of the lug grooves in the inner side region and a groove depth Hd2 of the lug grooves in the outer side region have a relationship such that 1.0 mm≤Hd1−Hd2≤3.0 mm.

11. The pneumatic tire according to claim 10, comprising three of the circumferential main grooves and four of the land portions in a tread portion; wherein a ground contact width of the land portions on the ground contact edge of the inner side region is greater than a ground contact width of the land portions on the ground contact edge of the outer side region;

the land portions in the inner side region comprise a plurality of inclined grooves inclining with respect to the tire circumferential direction, a plurality of first lug grooves extending in a tire width direction from an outer side of the tire ground contact patch so as to communicate with the inclined grooves, and a plurality of second lug grooves extending in the tire width direction so as to connect the inclined grooves and the circumferential main grooves; and not less than three of the first lug grooves are in communication with one of the inclined grooves.

12. The pneumatic tire according to claim 11, having an indicator designating a mounting direction on a vehicle wherein the inner side region is on an inner side in a vehicle width direction.

13. The pneumatic tire according to claim 1, from the tire equatorial plane CL, a distance DE to a tire ground contact edge T, a distance D1 to a groove center line of a first circumferential main groove partitioning a first land portion, and a distance D3 to a third circumferential main groove partitioning a fourth land portion have relationships such that 0.10≤D1/DE≤0.30 and 0.55≤D3/DE≤0.75.

14. The pneumatic tire according to claim 13, wherein 0.15≤D1/DE≤0.25.

15. The pneumatic tire according to claim 1, comprising three of the circumferential main grooves and four of the land portions in a tread portion.

16. The pneumatic tire according to claim 1, wherein a ground contact width of the land portions on the ground contact edge of the inner side region is greater than a ground contact width of the land portions on the ground contact edge of the outer side region.

17. The pneumatic tire according to claim 1, wherein the land portions in the inner side region comprise a plurality of inclined grooves inclining with respect to the tire circumferential direction, a plurality of first lug grooves extending in a tire width direction from an outer side of the tire ground contact patch so as to communicate with the inclined grooves, and a plurality of second lug grooves extending in the tire width direction so as to connect the inclined grooves and the circumferential main grooves.

18. The pneumatic tire according to claim 17, wherein not less than three of the first lug grooves are in communication with one of the inclined grooves.

19. A pneumatic tire comprising a plurality of circumferential main grooves extending in a tire circumferential direction, and a plurality of land portions that are partitioned and formed by the circumferential main grooves in a tread portion, wherein, when a region corresponding to 35% of a tread pattern developed width from a first tread edge is called an inner side region, a region corresponding to 35% of the tread pattern developed width from a second tread edge is called an outer side region, the left and right circumferential main grooves outermost in a tire width direction are called outermost circumferential main grooves, and the land portions on the outer side in the tire width direction partitioned and formed by the left and right outermost circumferential main grooves are called shoulder land portions, the plurality of land portions each have a plurality of sipes, not less than 90% of the sipes disposed in the inner side region are constituted by two-dimensional sipes and not less than 90% of the sipes disposed in the outer side region are constituted by three-dimensional sipes, the two-dimensional sipes having a sipe wall face with a linear form when viewed as a cross-section from a direction perpendicular to a sipe length direction, and the three-dimensional sipes having a sipe wall face with a form bending in a sipe width direction when viewed as a cross-section from a direction perpendicular to a sipe length direction, the left and right shoulder land portions each have a plurality of lug grooves arranged in the tire circumferential direction, a pitch number $N_{in}$ of the lug grooves in the shoulder land portion on the inner side region side and a pitch number $N_{out}$ of the lug grooves in the shoulder land portion on the outer side region side have a relationship such that $N_{in} > N_{out}$, and a groove width W1 of the lug grooves in the inner side region and a groove width W2 of the lug grooves in the outer side region have a relationship such that 0.5 mm≤W1−W2≤2.0 mm.

20. A pneumatic tire comprising a plurality of circumferential main grooves extending in a tire circumferential direction, and a plurality of land portions that are partitioned and formed by the circumferential main grooves in a tread portion, wherein, when a region corresponding to 35% of a tread pattern developed width from a first tread edge is called an inner side region, a region corresponding to 35% of the tread pattern developed width from a second tread edge is called an outer side region, the left and right circumferential main grooves outermost in a tire width direction are called outermost circumferential main grooves, and the land portions on the outer side in the tire width direction partitioned and formed by the left and right outermost circumferential main grooves are called shoulder land portions, the plurality of land portions each have a plurality of sipes, not less than 90% of the sipes disposed in the inner side region are constituted by two-dimensional sipes and not less than 90% of the sipes disposed in the outer side region are constituted by three-dimensional sipes, the two-dimensional sipes having a sipe wall face with a linear form when viewed as a cross-section from a direction perpendicular to a sipe length direction, and the three-dimensional sipes having a sipe wall face with a form bending in a sipe width direction when viewed as a cross-section from a direction perpendicular to a sipe length direction, the left and right shoulder land portions each have a plurality of lug grooves arranged in the tire circumferential direction, a pitch number $N_{in}$ of the lug grooves in the shoulder land portion on the inner side region side and a pitch number $N_{out}$ of the lug grooves in the shoulder land portion on the outer side region side have a relationship such that $N_{in} > N_{out}$, each of the inner side region and the outer side region comprises lug grooves that open to a tire ground contact edge, and a groove depth Hd1 of the lug grooves in the inner side region and a groove depth Hd2 of the lug grooves in the outer side region have a relationship such that $1.0 \text{ mm} \leq Hd1 - Hd2 \leq 3.0 \text{ mm}$.

\* \* \* \* \*